3,475,201
METEOROLOGICAL BALLOON
Donald D. Hundt, Arlington, and Andrew J. Kelly, West
Roxbury, Mass., assignors to W. R. Grace & Co., Cambridge, Mass., a corporation of Connecticut
No Drawing. Filed July 19, 1966, Ser. No. 566,225
Int. Cl. B44d 1/22; B05b 13/06
U.S. Cl. 117—94
8 Claims

ABSTRACT OF THE DISCLOSURE

Meteorological ballons formed of neoprene envelopes are coated with a cured composition composed of a reinforcing filler and certain elastomeric polymers of an alkylene oxide or α-olefins. Illustrative fillers include silica and carbon black. A typical elastomeric polymer consists of propylene oxide copolymerized with butadiene monoxide. The coatings endow the balloon with increased tensile strength and resistance to ozone attack.

---

This invention relates to inflatable rubber articles and, in particular, it relates to meteorological balloons.

Modern weather forecasting requires considerable information about the atmosphere, such as temperature, barometric pressure, wind velocity and direction, type and amount of precipitation and certain other data. Besides information pertaining to local surface conditions, effective forecasting demands supplemental data from intermediate, high and very high altitudes. In collecting the necessary data at high altitudes, meteorologists have relied heavily on ballons of various types and performance characteristics including the sounding balloon. These balloons are designed to carry aloft a radiosonde, rawinsonde, or other instrument group to determine humidity and temperature at various altitudes and, depending upon the instrument used, to determine wind direction and wind velocity as well.

The sounding balloons most widely used are composed of cured neoprene films which usually contain plasticizers, antioxidants, antiozonants, and optionally, fillers and pigments. While the performance of conventional neoprene balloons has been highly satisfactory and met the many demands of weather-forecasting methods, further improvements in certain properties would be desirable. For example, conventional neoprene balloon films exhibit comparatively low modulus at low elongation so that the balloon tends to be blown out of shape by moderate winds at the time of launching and may be carried along an oblique course at low altitudes after being released. Besides distortion caused by wind, air resistance tends to flatten the top of the balloon whereby the horizontal diameter is increased and the vertical diameter decreased which results in lower ascension rates. Also, balloon films are under a high degree of biaxial extension (up to 800%) and become extremely thin ($2.5 \times 10^{-4}$ inches or less) at high altitudes where the effects of ozone and ultraviolet are most intense. Though exhibiting good resistance to oxidation, the compounded neoprene films in current use become somewhat brittle when exposed to ozone under these adverse conditions. This loss of flexibility leads to formation of minute cracks in the film and frequently to rupture of the balloon before maximum altitudes are attained.

It is, therefore, the main object of the present invention to provide meteorological balloons possessing improved properties including higher modulus at low elongation and greater resistance to ozone attack.

This object is accomplished by coating a standard neoprene balloon envelope with a curable composition of an ozone-resistant elastomeric polymer and a reinforcing filler. More specifically, the present invention provides a meteorological balloon comprising a cured neoprene envelope provided with an aperture for receiving lifting gas and having a coating on its outer surface composed of a cured composition comprising an ozone-resistant elastomer and a reinforcing filler, said composition having a tensile modulus at 50% elongation of at least about twice the modulus of the balloon envelope as measured at 25° C. and at —40° C., a tensile modulus at 1000% elongation of not more than five times the modulus of the balloon envelope as measured at 25° C. and at —40° C., and an ultimate elongation at least equal to the ultimate elongation of the neoprene envelope at —40° C. In a particular embodiment, the present invention provides a meteorological ballon wherein the cured neoprene envelope has a coating on its outer surface composed of a cured composition comprising 100 parts by weight of an elastomeric alkylene oxide polymer and between about 10 and 100 parts by weight of a reinforcing filler.

The elastomeric polymers used in carrying out the present invention should be highly resistant to ozone attack and capable of being compounded with a reinforcing filler to give a cured composition having the tensile modulus and elongation characteristics necessary for satisfactory performance in balloon applications. For reducing distortion of the balloon at launching and at low altitudes, the cured composition used to coat the neoprene envelope should have a tensile modulus of at least twice that of the neoprene film at an elongation of 50% as measured at room temperature and low temperatures. At an elongation of 1000% at a temperature of about —40° C., the cured coating composition should have a tensile modulus of not more than five times that of the neoprene so that rapid ascension rates will be maintained at high altitudes with standard amounts of lifting gas.

Besides the requirements as to modulus, the cured elastomeric composition used as the balloon coating should have an ultimate elongation at —40° C. which is at least equal to that of the neoprene balloon film. If the ultimate elongation of the balloon coating is less than the ultimate elongation of the neoprene envelope at low temperatures, the balloon will burst at altitudes considerably below those normally attained. Ozone-resistance at high altitudes and thus at low temperatures is also important for achieving good high altitude performance. For this reason, the cured reinforced elastomer in the absence of an antioxidant or antiozonant should resist cracking and breaking for a period of at least 120 hours in an atmosphere containing 150 parts per hundred million ozone at a temperature of about 20° C.

Among the elastomeric polymers which may be employed are substantially amorphous alkylene oxide copolymers and substantially amorphous chain-saturated α-monoolefin copolymers. Such elastomeric polymers are especially useful in the present invention since in their cured state they possess the necessary resistance to ozone attack and can be compounded with reinforcing fillers to give compositions having the modulus, elongation and other properties required for balloon applications.

The alkylene oxide rubbers employed are copolymers composed of (a) a saturated 1,2-alkylene oxide and (b) a vinyl epoxy monomer wherein the epoxy monomer is present in an amount between about 1 and 25% by weight of the polymer. By "saturated 1,2 alkylene oxide" is meant an organic compound which is free of aliphatic unsaturation and which contains solely carbon, hydrogen and oxirane oxygen wherein said oxirane oxygen is bonded to vicinal carbon atoms. The alkylene oxide contains between about 3 and 20 carbon atoms, such as propylene oxide, butylene oxides, pentylene oxides, and duodecylene oxides. The preferred saturated 1,2 alkylene oxides are propylene and butylene oxide.

The vinyl epoxy monomer copolymerized with the 1,2-alkylene oxide may be an epoxy-1-alkene, e.g., 3,4-epoxy-1-butene, 1,2-epoxy-2-methyl-3,4-epoxy-1-butene; a terminal alkenyl epoxy alkanoate, e.g. allyl 2,3-epoxy-butanoate, vinyl 10,11-epoxyundecanoate and allyl 3,4-epoxy-cyclohexanecarboxylate; a terminal alkenyl epoxyalkyl ether, e.g. allyl glycidyl ether, allyl 2,3-epoxypentyl ether and allyl 2,3-epoxybutyl ether; or a terminal alkenyl epoxy cycloalkyl or cycloalkylalkyl ether e.g., allyl 2,3-epoxy cyclopentyl ether, allyl 3,4-epoxycyclohexylmethyl ether and allyl 6-methyl-3,4-epoxycyclohexylmethyl ether. The vinyl epoxy monomer may also be a vinyl aryl or vinyl cycloalkenyl monoxide e.g., ortho-, meta-, para-divinyl-benzene monoxide and vinyl cyclohexane monoxide or an epoxy alkyl or cycloalkyl acrylate, e.g., glycidyl acrylate, 2,3-epoxybutyl acrylate and 6-methyl-3,4-epoxycyclo-hexylmethyl acrylate. By "terminal alkenyl" is meant an alkenyl radical containing the group $CH_2=C<$ therein.

The elastomeric chain-saturated α-olefin copolymers useful in the present invention are copolymers of at least two α-monoolefins or of at least one α-monoolefin and at least one non-conjugated hydrocarbon diene. The α-monoolefins employed have the structure $R-CH=CH_2$ where R is hydrogen or an alkyl group containing 1 to 16 carbon atoms. Illustrative of useful α-monoolefins are ethylene; propylene; 1-butene; 4-methyl-1-pentene; 1-pentene; 1-hexene; 1-heptene; 1-octene; 1-decene; 5,5-dimethyl-1-octene; 4,4-dimethyl-1-pentene; 5-methyl-1-hexene; 5,6,6-trimethyl-1-heptene; 1-dodecene; and 1-octadecene.

Representative of the non-conjugated dienes which may be copolymerized with one or more α-olefins include cyclopentadiene; open-chain $C_6-C_{22}$ dienes having the structure

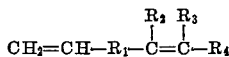

wherein $R_1$ is an alkylene radical, $R_2$, $R_3$ and $R_4$ are independently selected from the group consisting of hydrogen and alkyl radicals, and $R_4$ is preferably an alkyl radical; and unsaturated endocyclic hydrocarbons containing two or more ethylenic double bonds, e.g., dicyclopentadiene, unsaturated derivatives of bicyclo-(2,2,1)-heptane including norbornenes, unsaturated derivatives of bicyclo-(2,2,2)-octane including bicyclo-(2,2,2)-octa-2,5-diene and unsaturated derivatives of bicyclo-(3,2,1)-octane, bicyclo-(3,3,1)-nonane and bicyclo-(3,2,2)-nonane. Of particular interest are 5-alkenyl-substituted 2-norbornenes; 5-methylene-2-norbornenes; 2-alkyl-2,5-norbornadienes; 1,4-hexadiene; 1,9-octadecadiene; 6-methyl-1,5-heptadiene; 11-ethyl-1, 11-tridecadiene; and particularly, dicyclopentadiene.

Representative examples of suitable elastomeric α-monoolefin copolymers include copolymers of ethylene/propylene; ethylene/propylene/1-butene; ethylene/propylene/dicyclopentadiene; ethylene/1,4-hexadiene; ethylene/1-octene/dicyclopentadiene; ethylene/propylene/1-hexene/dicyclopentadiene; and ethylene/propylene/1,4-hexadiene. In these copolymers the amount of ethylene generally does not exceed 75% by weight and usually ranges between about 25 and 75% by weight. In terpolymers of ethylene, at least one other α-monoolefin and at least one non-conjugated diene, the amounts of ethylene and second α-monoolefin range between about 25% and 75% and 75% and 25%, respectively, with the diene being present in amounts up to about 10% by weight.

The fillers used in the present invention should have a reinforcing effect on the elastomer and improve its mechanical properties rather than functioning merely as a diluent. Any of the reinforcing fillers commonly used for this purpose in the rubber art may be employed, such as fumed silica, hydrated silica, calcium silicate, regenerated hard clay, ultrafine carbonates, and reinforcing carbon blacks, e.g., furnace blacks, channel blacks and thermal blacks. For balloon coatings, a silica or other reinforcing filler which does not absorb heat is preferred so that there will be greater consistency in the high altitude performance of the balloon between nighttime and daytime flights.

The filler is incorporated in the rubber composition in an amount that will provide a cured coating having the requisite modulus and elongation characteristics. As based on 100 parts by weight of rubber, the amount of reinforcing filler may range between about 10 and 100 parts by weight. At least about 10 parts by weight filler is necessary for obtaining a cured film, and thus, a coated neoprene balloon having improved modulus at low elongation while amounts above about 100 parts by weight filler tend to decrease elongation of the cured coating. Any significant decrease in elongation of the coated balloon envelope is undesirable since lower elongation results in lower ultimate altitudes attained by the balloon.

In curing the alkylene oxide and α-olefin rubber compositions, a free radical or a conventional sulfur-metallic oxide curing system may be used. With copolymers which are essentially free from ethylenic unsaturation, such as a copolymer of ethylene and propylene, a free radical cure is preferred. Customarily, the free radical generators employed are organic peroxides, such as dialkyl, dialkaryl, diaroyl and bis(tert-alkyl peroxy)-alkanes, which are used in an amount between about 2 and 5 parts by weight per 100 parts by weight of rubber. Specific examples of suitable organic peroxides are dicumyl peroxide, di-t-butyl peroxide, dibenzoyl peroxide, diacetyl peroxide, and 2,5-bis(t-butylperoxy)-2,5-dimethyl hexane. If desired, between about 0.5% to 6% by weight a free radical acceptor may be used with the organic peroxide. Free radical acceptors which may be used include N-substituted maleimides, e.g., N-phenyl maleimide, N,N'-substituted bismaleimide; e.g., N,N'-ethylene bismaleimide; and N,N'- substituted bisacrylamides, e.g., methylene bisacrylamide.

The sulfur-metallic oxide curing system which may be used comprises, for example, between 0.2 and 2 parts by weight elemental sulfur, between 3 and 10 parts by weight zinc oxide and between 0.5 and 3 parts by weight of a curing accelerator, such as a dithiocarbamate, a thiuram sulfide, a thiazole or mixtures thereof. Examples of dithiocarbamates that may be employed are zinc dimethyl dithiocarbamate, piperidinium pentamethylene dithiocarbamate, nickel dibutyl dithiocarbamate and tellurium diethyl dithiocarbamate. Representative examples of thiuram sulfides are tetramethyl thiuram monosulfide, tetramethyl thiuram tetrasulfide and tetraethyl thiuram disulfide, while examples of suitable thiazoles include 2-mercaptobenzothiazole, 2-methyl mercaptobenzothiazole, and 2-ethylbenzothiazole.

In addition to the filler and curing system, plasticizers, processing aids and other compounding ingredients may be used and are added in conventional amounts to achieve the desired effect.

In coating conventional neoprene balloons according to the present invention, the rubber composition is dissolved in a solvent for the rubber, a mixture of solvents or a mixture of solvent and diluent. Typical of the solvents which may be used with the alkylene oxide rubbers are ketones, e.g., acetone, dimethyl ketone and methyl ethyl ketone. An example of a suitable solvent-diluent blend is composed of methyl ethyl ketone, and toluene. Typical of the solvents used for the α-olefin rubbers are aromatic hydrocarbons, e.g., benzene, which may be used in admixture with acetone to form a solvent-diluent blend. For spray-coating or dip-coating the balloon, a total solids concentration of between about 10 and 15% by weight has been found satisfactory. The cured thickness of the coating applied to the neoprene envelope varies between about 0.5 and 1.0 mil.

The neoprene balloons used in the present invention are prepared in the conventional manner by coating a balloon mold with a coagulant, immersing the coagulant-coated mold in an aqueous neoprene dispersion and allowing the mold to dwell in the dispersion until a layer of rubber gel having the desired thickness has formed. The mold carrying the rubber gel is then soaked in water to remove water solubles. After soaking but before the gel has dried, it is stripped from the mold, coated with talc, and inflated to 4½ to 5 times its original diameter and dried at room temperature while inflated.

Either before or after the dried neoprene gel is deflated, the solvent solution of ozone-resistant rubber is applied to the exterior surface of the envelope. The solvent is evaporated from the coating at room temperature, and thereafter, the dried envelope carrying the dried coating is cured at a temperature of between about 150° to 165 °C. for twenty to sixty minutes followed by one to two hours at a temperature between about 120° to 135° C.

It will be understood that the present invention is also useful in the production of meteoroligcal ballons other than sounding balloons, for example, ceiling balloons and pilot balloons and in fabricating other inflatable neoprene articles having improved modulus and greater resistance to ozone attack.

The following example is given to illustrate the present invention more clearly. All parts given are in parts by weight unless specified otherwise.

EXAMPLE

Ingredients: Parts by weight
Copolymer of 96% by weight propylene oxide and 4% by weight butadiene monoxide ____ 100
Hydrated silica (reinforcing filler) _____ 20
Stearic acid (processing aid) _____ 1
Zinc oxide (curing agent) _____ 3
Sulfur (curing agent) _____ 0.8
Tetramethyl thiuram disulfide (curing accelerator) _____ 1
Nickel dibutyl dithiocarbamate (curing accelerator) _____ 1

The above composition was prepared by blending the ingredients in a Banbury mixer in which the temperature was maintained below 135° C. After a homogeneous mixture was obtained, the batch was divided into two portions. One portion was sheeted out for the purpose of determining the modulus of the composition. The other portion was dissolved in a suitable solvent and used to coat a dried but uncured high altitude sounding balloon (neoprene envelope).

The sheet produced from the first portion of the composition had a thickness of 0.025 inch and was cured for 20 minutes at about 50° C. Dumbbell-shaped specimens having a restricted section 0.125 inch wide and 0.75 inch long were cut from the sheet, and the tensile modulus was determined on an Instron set-up. In testing the specimens, the gauge length used was 1 inch, and the cross head speed was 20 inches per minute at room temperature approximately 25° C.) and 1 inch per minute at —40° C.

For comparative purposes, dumbbell-shaped specimens having the same dimensions were cut from a standard neoprene balloon envelope and tested for tensile modulus in the same manner.

The results obtained in terms of pounds per square inch at elongations of 50% and 1000% as measured at both 25° C. and —40° C. were as follows:

TABLE I

| Modulus | Neoprene Envelope (p.s.i.) | Cured Sheet of the Example (p.s.i.) |
|---|---|---|
| At 25° C.: | | |
| 50% elongation | 55 | 140 |
| 1,000% elongation | 530 | 2,300 |
| At —40° C.: | | |
| 50% elongation | 45 | 110 |
| 1,000% elongation | 1,100 | 3,200 |

The second portion of the above composition was chopped into small pieces, and 100 grams of the blend was dissolved in 1000 grams of a solvent mixture consisting of 85 parts by weight methyl ethyl ketone and 15 parts by weight toluene.

The resulting solution was spray-coated onto the outer surface of a dried but uncured neoprene envelope as conventionally used for sounding balloons. The wall thickness of the dried envelope was about 4.6 mils, and it was composed of neoprene compounded with a zinc oxide curing agent, a dithiocarbamate curing accelerator and a plasticizer and a stabilizer for the neoprene. After the coating was applied, the solvent was evaporated at room temperature, and the coated envelope was cured in an oven for 20 minutes at about 150° C. plus 2 hours at about 125° C. The final thickness of the alkylene oxide coating was about 0.7 mil, and the coating completely covered the entire outer surface of the envelope.

Dumbbell-shaped samples were cut from the coated balloon and were tested for tensile modulus, tensile strength and elongation at break at both room temperature (25° C.) and —40° C. Also, the ozone resistance of the coated balloon was determined by elongating each sample 600% and subjecting the elongated strips to 150 parts per hundred million ozone for 120 hours at a temperature of 20° C. Cracking of the samples indicated ozone attack while breaking of the dumbbell sample at its restricted portion measuring 0.125 inch wide was considered a sample failure.

For comparative purposes, samples were cut from a cured but uncoated neoprene envelope and tested for the same properties. The results obtained are given in Table II below.

TABLE II

| | Uncoated Neoprene Envelope (Control) | Neoprene Envelope Coated with Composition of the Example |
|---|---|---|
| Film Thickness (mils) | 4.6 | 5.3 |
| Modulus at Room Temperature (p.s.i.): | | |
| 50% Elogation | 55 | 90 |
| 100% Elongation | 85 | 125 |
| 500% Elongation | 210 | 325 |
| 1,000% Elongation | 530 | 1,260 |
| Modulus at —40° C. (p.s.i.): | | |
| 50% Elongation | 45 | 110 |
| 100% Elongation | 75 | 130 |
| 500% Elongation | 300 | 900 |
| 1,000% Elongation | 1,100 | 4,000 |
| Ultimate Tensile Strength at Room Temperature (p.s.i.) | 1,100 | 2,600 |
| Ultimate Tensile Strength at —40° C. (p.s.i.) | 1,800 | 5,000 |
| Ultimate Elongation at —40° C. Percent | 1,200 | 1,200 |
| Ozone resistance in 120 hour test at 20° C | (1) | (2) |

[1] Some indication of ozone attack. 2 out of 4 samples failed.
[2] No indication of ozone attack. No sample failure.

From the date set forth in Table II it is readily apparent that the samples from the neoprene envelope coated with the propylene oxide rubber composition possess far better resistance to ozone attack and greater tensile strength than the sample from the uncoated neoprene envelope. In addition, the coated neoprene envelope exhibits considerable improved modulus at low and high elongation at both room temperature and —40° C. while still possessing the high elongation necessary for attaining maximum altitudes.

We claim:
1. A meteorological balloon comprising a cured neoprene envelope provided with an aperture for receiving lifting gas and having a coating on its outer surface composed of a cured composition comprising an ozone-resistant elastomer selected from the group consisting of
  (1) a copolymer of a saturated 1,2-alkylene oxide and a vinyl epoxy monomer, and
  (2) an α-olefinic copolymer selected from the group consisting of

(a) a copolymer of at least two α-monoolefins, and (b) a copolmer of at least one α-monoolefin and at least one non-conjugated hydrocarbon diene and a reinforcing filler, said composition having a tensile modulus at 50% elongation of at least about twice the modulus of the balloon envelope as measured at 25° C. and at −40° C., a tensile modulus at 1000% elongation of not more than five times the modulus of the balloon envelope as measured at 25° C. and at −40° C., and an ultimate elongation at least equal to the ultimate elongation of the neoprene envelope at −40° C.

2. A meteorological balloon according to claim 1 wherein the neoprene envelope and the cured coating composition have the following tensile moduli at the stated temperatures and percent elongation:

| Modulus | Neoprene Envelope (p.s.i.) | Cured Coating Composition (p.s.i.) |
|---|---|---|
| (a) At 25° C.: | | |
| 50% elongation | 55 | 140 |
| 1,000% elongation | 530 | 2,300 |
| (b) At −40° C.: | | |
| 50% elongation | 45 | 110 |
| 1,000% elongation | 1,100 | 3,200 |

3. A meteorological balloon according to claim 2 wherein the thickness of the neoprene envelope is about 4.6 mils and the coating is between about 0.5 and 1.5 mil.

4. A meteorological balloon comprising a cured neoprene envelope provided with an aperture for receiving lifting gas and having a coating on its outer surface composed of a cured composition comprising 100 parts by weight of a copolymer of a saturated 1,2-alkylene oxide, and a vinyl epoxy monomer, between about 0.5 and 2.0 parts by weight sulfur and between about 10 and 100 parts by weight of a reinforcing filler.

5. A meteorological balloon according to claim 4 wherein the copolymer is composed of a saturated 1,2-alkylene oxide having 3 to 20 carbon atoms and the vinyl epoxy monomer is present in an amount between 1 and 25% by weight of the copolymer.

6. A meteorological balloon according to claim 5 wherein the copolymer is composed of 96% by weight propylene oxide and 4% by weight butadiene monoxide.

7. A meteorological balloon according to claim 6 wherein the reinforcing filler is silica.

8. A meteorological balloon according to claim 7 wherein the thickness of the coating is between about 0.5 and 1.0 mil.

References Cited

UNITED STATES PATENTS 2,492,800  12/1949  Isom _____ 244—31
3,031,439  4/1962  Bailey.

ALFRED L. LEAVITT, Primary Examiner

CHARLES R. WILSON, Assistant Examiner

U.S. Cl. X.R.

117—139, 161; 244—31